United States Patent
Kubota

(10) Patent No.: US 12,149,194 B2
(45) Date of Patent: Nov. 19, 2024

(54) POWER SUPPLY CIRCUIT AND ROTARY ELECTRIC MACHINE SYSTEM

(71) Applicant: HONDA MOTOR CO., LTD., Tokyo (JP)

(72) Inventor: Yoshihisa Kubota, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 199 days.

(21) Appl. No.: 17/943,397

(22) Filed: Sep. 13, 2022

(65) Prior Publication Data

US 2023/0088809 A1     Mar. 23, 2023

(30) Foreign Application Priority Data

Sep. 21, 2021    (JP) ................................ 2021-153635

(51) Int. Cl.
*H02P 27/06* (2006.01)
*H02M 1/088* (2006.01)

(52) U.S. Cl.
CPC ............ *H02P 27/06* (2013.01); *H02M 1/088* (2013.01)

(58) Field of Classification Search
CPC ............................... H02P 27/06; H02M 1/088
USPC ......................................................... 318/504
See application file for complete search history.

(56) References Cited

U.S. PATENT DOCUMENTS

| | | | |
|---|---|---|---|
| 2010/0082191 A1* | 4/2010 | Seo ...................... | B60L 15/2045 180/65.21 |
| 2014/0009097 A1 | 1/2014 | Kawati et al. | |

FOREIGN PATENT DOCUMENTS

| | | | | |
|---|---|---|---|---|
| JP | 2012-213306 A | | 11/2012 | |
| JP | 2016167963 A | * | 9/2016 | ............. H02K 21/22 |
| WO | WO-2018050846 A1 | * | 3/2018 | |

* cited by examiner

*Primary Examiner* — Kawing Chan
(74) *Attorney, Agent, or Firm* — Paratus Law Group, PLLC

(57) ABSTRACT

A power supply circuit configured to supply electric power to a rotary electric machine that includes: a first phase winding including a first winding portion and a second winding portion; and a second phase winding including a third winding portion and a fourth winding portion, the power supply circuit including: a first circuit connected to the first phase winding; and a second circuit connected to the second phase winding. The first circuit includes: first to third arms, and a first switch. The second circuit includes: fourth to sixth arms; and a second switch.

4 Claims, 12 Drawing Sheets

| MODE (TURN NUMBER) | ELEVENTH MODE ($\alpha1+\alpha2+\alpha3$, $\beta1+\beta2+\beta3$) | TWELFTH MODE ($\alpha1+\alpha2$, $\beta1+\beta2$) | THIRTEENTH MODE ($\alpha2+\alpha3$, $\beta2+\beta3$) |
|---|---|---|---|
| ELECTRIC CIRCUIT | | | |
| sw1a / sw1b | ○ | ○ | |
| sw2a / sw2b | ○ | ○ | ○ |
| sw3a / sw3b | ○ | | ○ |

| MODE (TURN NUMBER) | FOURTEENTH MODE ($\alpha1$, $\beta1$) | FIFTEENTH MODE ($\alpha2$, $\beta2$) | SIXTEENTH MODE ($\alpha3$, $\beta3$) |
|---|---|---|---|
| ELECTRIC CIRCUIT | | | |
| sw1a / sw1b | ○ | | |
| sw2a / sw2b | | ○ | |
| sw3a / sw3b | | | ○ |

POWER SUPPLY CIRCUIT AND ROTARY ELECTRIC MACHINE SYSTEM

CROSS REFERENCE TO RELATED APPLICATIONS

This application claims priority to Japanese Patent Application No. 2021-153635 filed on Sep. 21, 2021, the content of which is incorporated herein by reference.

TECHNICAL FIELD

The present invention relates to a power supply circuit and a rotary electric machine system.

BACKGROUND ART

In recent years, as a specific measure against global climate change, efforts toward implementation of a low-carbon society or a decarbonized society have become active. Even in vehicles, there is a strong demand for reduction of $CO_2$ emissions, and electrification of drive sources is rapidly progressing.

JP 2012-213306 A describes a three-phase AC motor provided with an energization mode switching unit, which is used as a drive source of an electric automobile. In this three-phase AC motor, an energization mode is switched by the energization mode switching unit between a low speed mode in which a first winding and a second winding are energized and a high speed mode in which only the first winding is energized.

However, although different characteristics can be imparted to the motor described in JP 2012-213306 A by changing the number of windings to which electric power is supplied in one motor, the number of lead wires and the number of switching elements are as large as 9 and 12, respectively, which complicates a configuration of the motor.

It is an object of the present invention to provide a power supply circuit and a rotary electric machine system capable of imparting different characteristics to a rotary electric machine while preventing complication of a configuration.

SUMMARY OF INVENTION

According to an aspect of the present invention, there is provided a power supply circuit configured to supply electric power to a rotary electric machine that includes: a first phase winding including a first winding portion and a second winding portion; and a second phase winding including a third winding portion and a fourth winding portion. The power supply circuit including: a first circuit that is connectable to a power supply and connected to the first phase winding; and a second circuit that is connectable to the power supply in parallel with the first circuit and connected to the second phase winding. The first circuit includes: first to third arms in each of which an upper arm provided with a switching element and a lower arm provided with a switching element are connected at a midpoint of each arm; and a first switch. The midpoint of the first arm is connected to one end of the first winding portion, the midpoint of the second arm is connected to another end of the first winding portion and one end of the second winding portion, and the midpoint of the third arm is connected to another end of the second winding portion. The first switch is provided in series with the first winding portion or between the switching element of the upper arm of the first arm and the switching element of the lower arm of the first arm, or is provided in series with the second winding portion or between the switching element of the upper arm of the third arm and the switching element of the lower arm of the third arm. The second circuit includes: fourth to sixth arms in each of which an upper arm provided with a switching element and a lower arm provided with a switching element are connected at a midpoint of each arm; and a second switch. The midpoint of the fourth arm is connected to one end of the third winding portion, the midpoint of the fifth arm is connected to another end of the third winding portion and one end of the fourth winding portion, and the midpoint of the sixth arm is connected to another end of the fourth winding portion. The second switch is provided in series with the third winding portion or between the switching element of the upper arm of the fourth arm and the switching element of the lower arm of the fourth arm, or is provided in series with the fourth winding portion or between the switching element of the upper arm of the sixth arm and the switching element of the lower arm of the sixth arm.

According to another aspect of the present invention, there is provided a rotary electric machine system including: a rotary electric machine including a first phase winding and a second phase winding; and a power supply circuit configured to supply electric power to the rotary electric machine. The first phase winding includes a first winding portion and a second winding portion, the second phase winding includes a third winding portion and a fourth winding portion. The power supply circuit includes: a first circuit that is connectable to a power supply and connected to the first phase winding; and a second circuit that is connectable to the power supply in parallel with the first circuit and connected to the second phase winding. The first circuit includes: first to third arms in each of which an upper arm provided with a switching element and a lower arm provided with a switching element are connected at a midpoint of each arm; and a first switch. The midpoint of the first arm is connected to one end of the first winding portion, the midpoint of the second arm is connected to another end of the first winding portion and one end of the second winding portion, and the midpoint of the third arm is connected to another end of the second winding portion. The first switch is provided in series with the first winding portion or between the switching element of the upper arm of the first arm and the switching element of the lower arm of the first arm, or is provided in series with the second winding portion or between the switching element of the upper arm of the third arm and the switching element of the lower arm of the third arm. The second circuit includes: fourth to sixth arms in each of which an upper arm provided with a switching element and a lower arm provided with a switching element are connected at a midpoint of each arm; and a second switch. The midpoint of the fourth arm is connected to one end of the third winding portion, the midpoint of the fifth arm is connected to another end of the third winding portion and one end of the fourth winding portion, the midpoint of the sixth arm is connected to another end of the fourth winding portion. The second switch is provided in series with the third winding portion or between the switching element of the upper arm of the fourth arm and the switching element of the lower arm of the fourth arm, or is provided in series with the fourth winding portion or between the switching element of the upper arm of the sixth arm and the switching element of the lower arm of the sixth arm.

BRIEF DESCRIPTION OF DRAWINGS

FIG. 2 is an operation explanatory diagram showing three modes of the rotary electric machine system of FIG. 1:

FIG. 10 is an operation explanatory diagram showing six modes of the rotary electric machine system of FIG. 9;

DESCRIPTION OF EMBODIMENTS

First, a first embodiment of the present invention will be described with reference to FIGS. 1 to 8.

(Rotary Electric Machine System)

Figure 1:
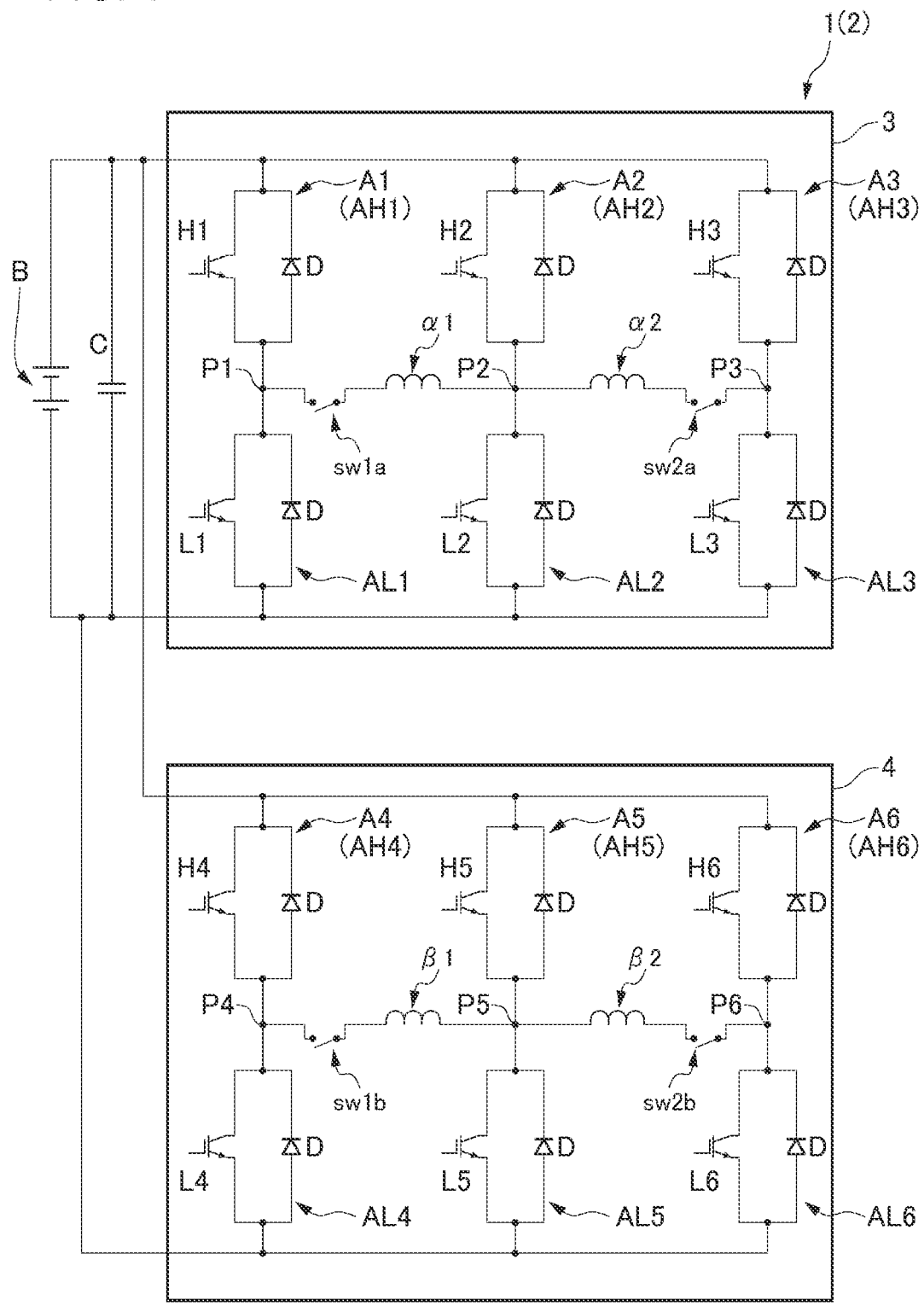
FIG. 1 is a circuit diagram showing a configuration of a rotary electric machine system of a first embodiment.
Figure 8:
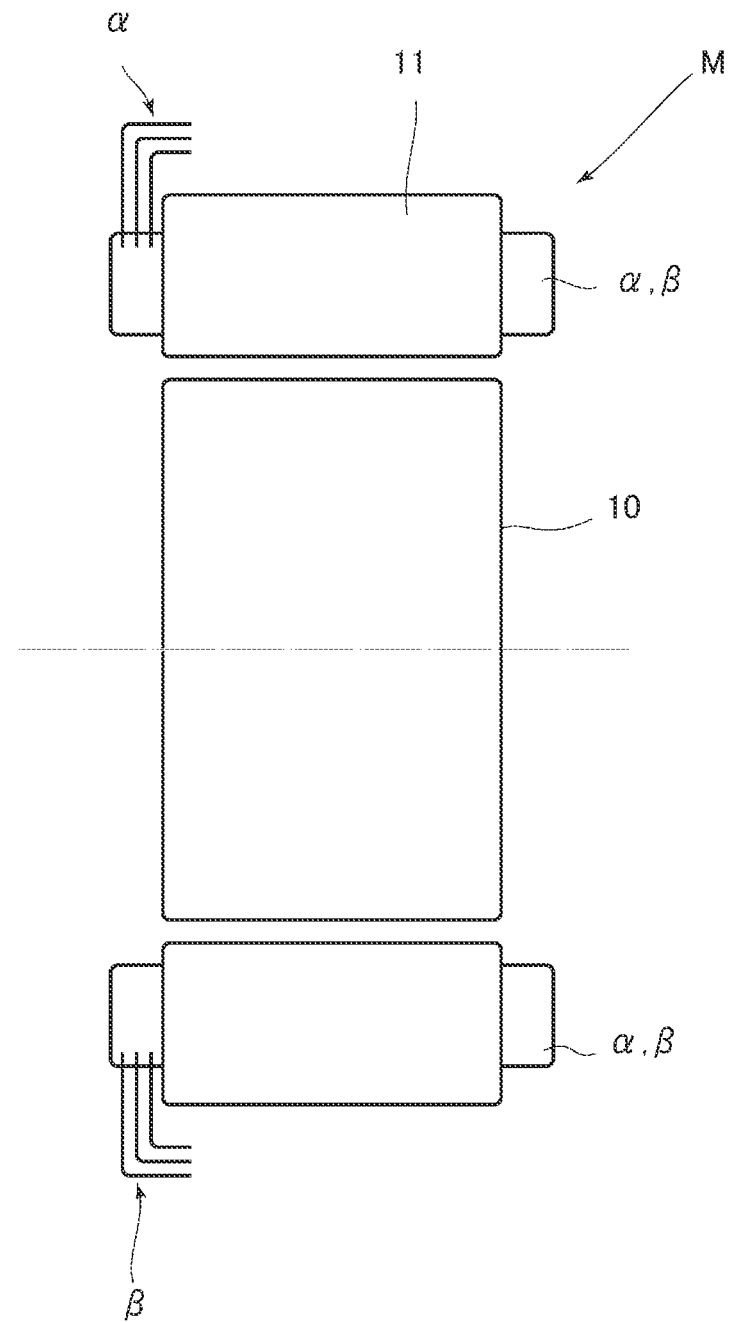
FIG. 8 is a schematic diagram of a rotary electric machine.
Figure 9:
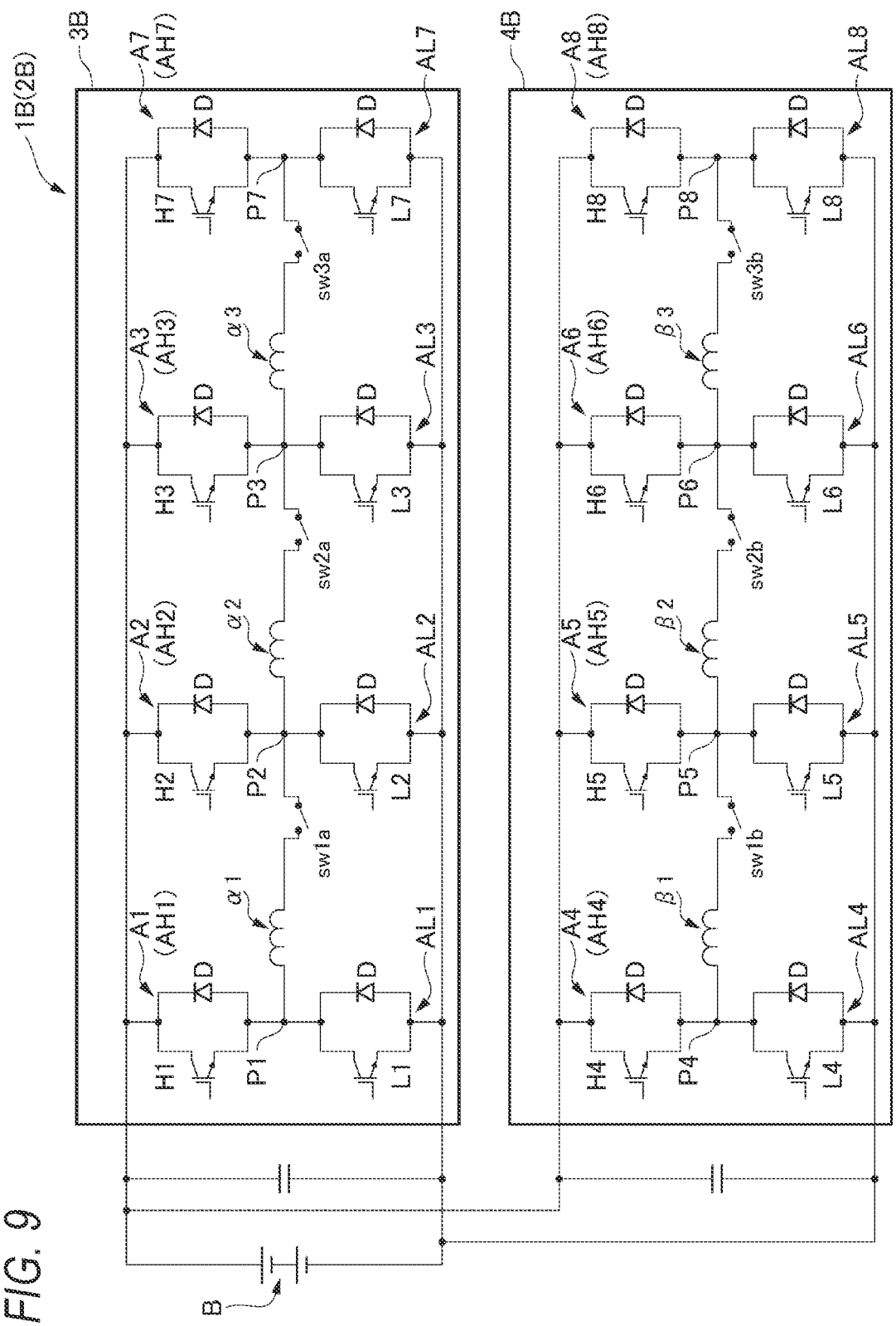
FIG. 9 is a circuit diagram showing a configuration of a rotary electric machine system of a second embodiment.
Figure 11:
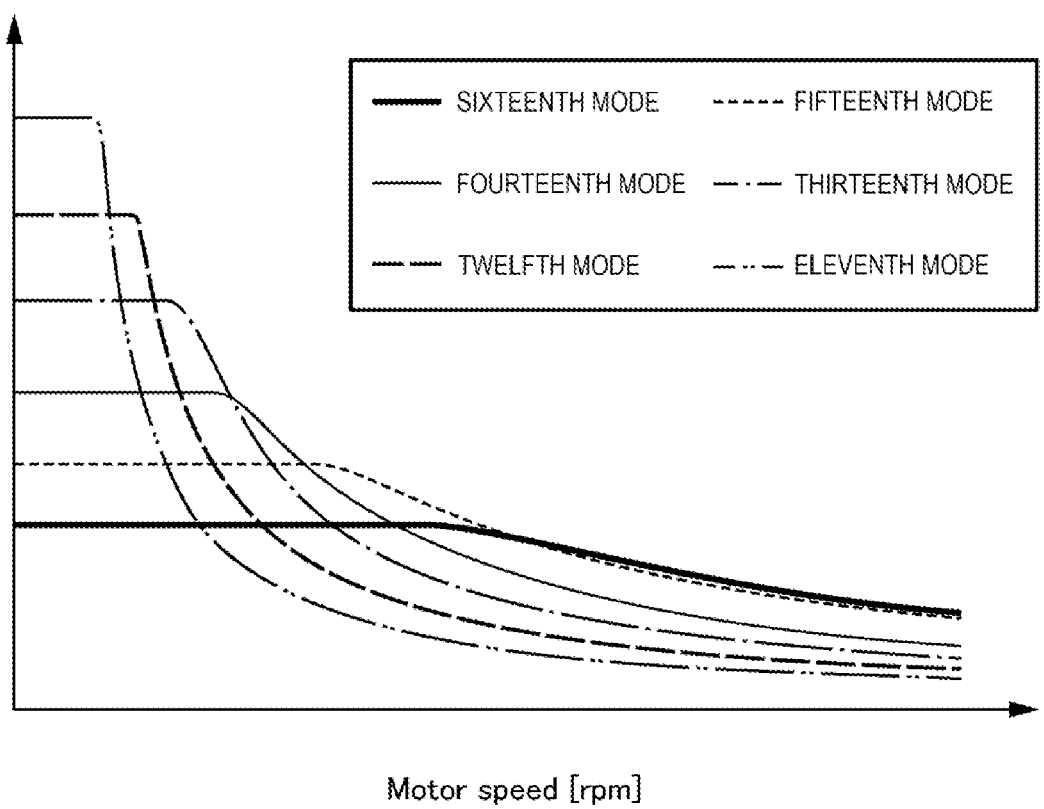
FIG. 11 is a graph showing torque performance in the six modes.
Figure 12:
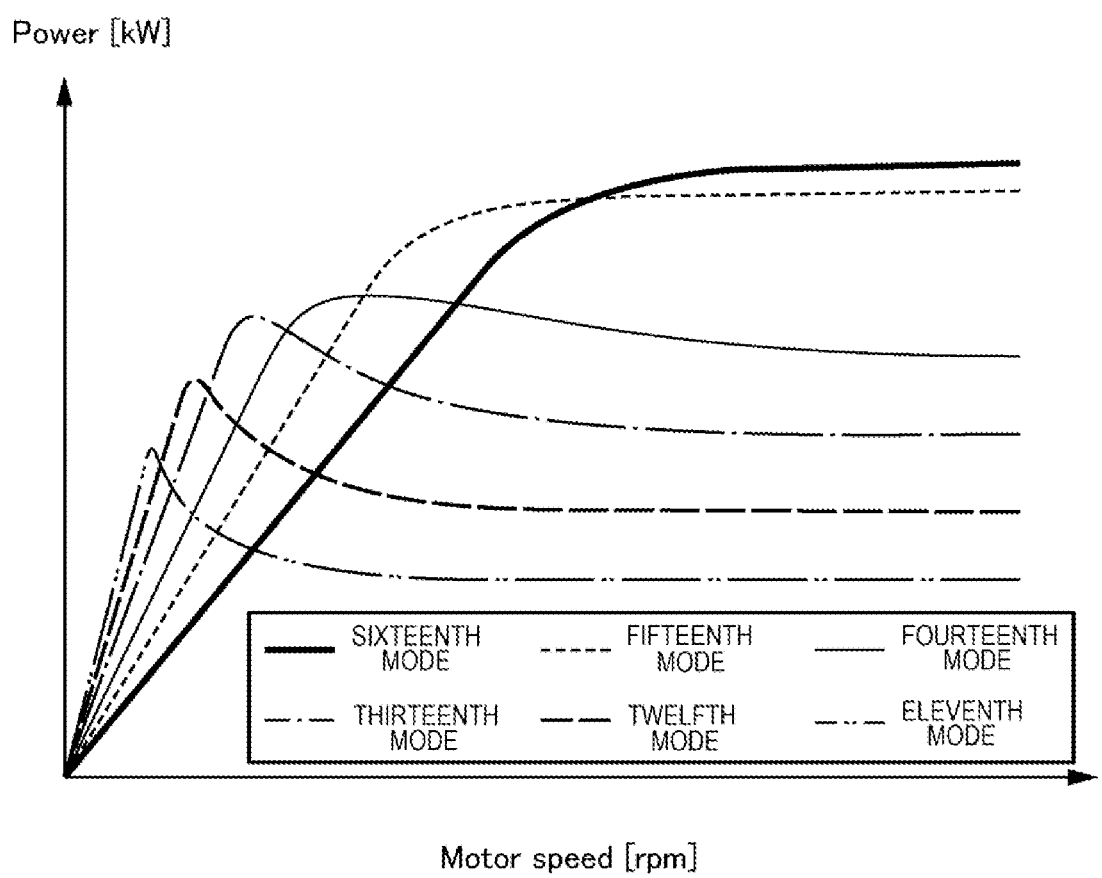
FIG. 12 is a graph showing output performance in the six modes.

As shown in FIGS. 1 and 8, a rotary electric machine system 1 includes a rotary electric machine M and a power supply circuit 2 that supplies electric power to the rotary electric machine M.

(Rotary Electric Machine)

As shown in FIG. 8, the rotary electric machine M is a two-phase rotary electric machine including a rotor 10, a stator 11, and a first phase winding α and a second phase winding β wound around the stator 11, and is constituted by, for example, a two-phase brushless motor. The first phase winding α and the second phase winding β are arranged, for example, on the stator 11 with an electrical angle offset by 90°. The first phase winding α includes a first winding portion α1 and a second winding portion α2, and the second phase winding β includes a third winding portion β1 and a fourth winding portion β2. The number of turns of the first winding portion α1 (also referred to as the turn number in the drawings) and the number of turns of the second winding portion α2 are different from each other, and in the present embodiment, the number of turns of the first winding portion α1 is more than the number of turns of the second winding portion α2. In addition, the number of turns of the third winding portion β1 and the number of turns of the fourth winding portion β2 are different from each other, and in the present embodiment, the number of turns of the third winding portion β1 is more than the number of turns of the fourth winding portion β2. However, the number of turns of the first winding portion α1 and the number of turns of the third winding portion β1 are the same, and the number of turns of the second winding portion α2 and the number of turns of the fourth winding portion β2 are also the same.

(Power Supply Circuit)

The power supply circuit 2 includes a first circuit 3 that is connected to a power supply B and connected to the first phase winding α, and a second circuit 4 that is connected to the power supply B in parallel with the first circuit 3 and connected to the second phase winding β. In FIG. 1, reference numeral C denotes a smoothing capacitor.

The first circuit 3 includes first to third arms A1 to A3, a first bidirectional switch sw1a, and a third bidirectional switch sw2a.

The first to third arms A1 to A3 are connected in parallel to the power supply B. The first arm A1 includes an upper arm AH1 in which a switching element H1 and a flyback diode D are provided in parallel, and a lower arm AL1 in which a switching element L1 and a flyback diode D are provided in parallel, the lower arm AL1 being connected in series with the upper arm AH1 via a midpoint P1. The second arm A2 includes an upper arm AH2 in which a switching element H2 and a flyback diode D are provided in parallel, and a lower arm AL2 in which a switching element L2 and a flyback diode D are provided in parallel, the lower arm AL2 being connected in series with the upper arm AH2 via a midpoint P2. The third arm A3 includes an upper arm AH3 in which a switching element H3 and a flyback diode D are provided in parallel, and a lower arm AL3 in which a switching element L3 and a flyback diode D are provided in parallel, the lower arm AL3 being connected in series with the upper arm AH3 via a midpoint P3.

One end of the first winding portion α1 is connected to the midpoint P1 of the first arm A1, the other end of the first winding portion α1 and one end of the second winding portion α2 are connected to the midpoint P2 of the second arm A2, and the other end of the second winding portion α2 is connected to the midpoint P3 of the third arm A3.

Figure 5:
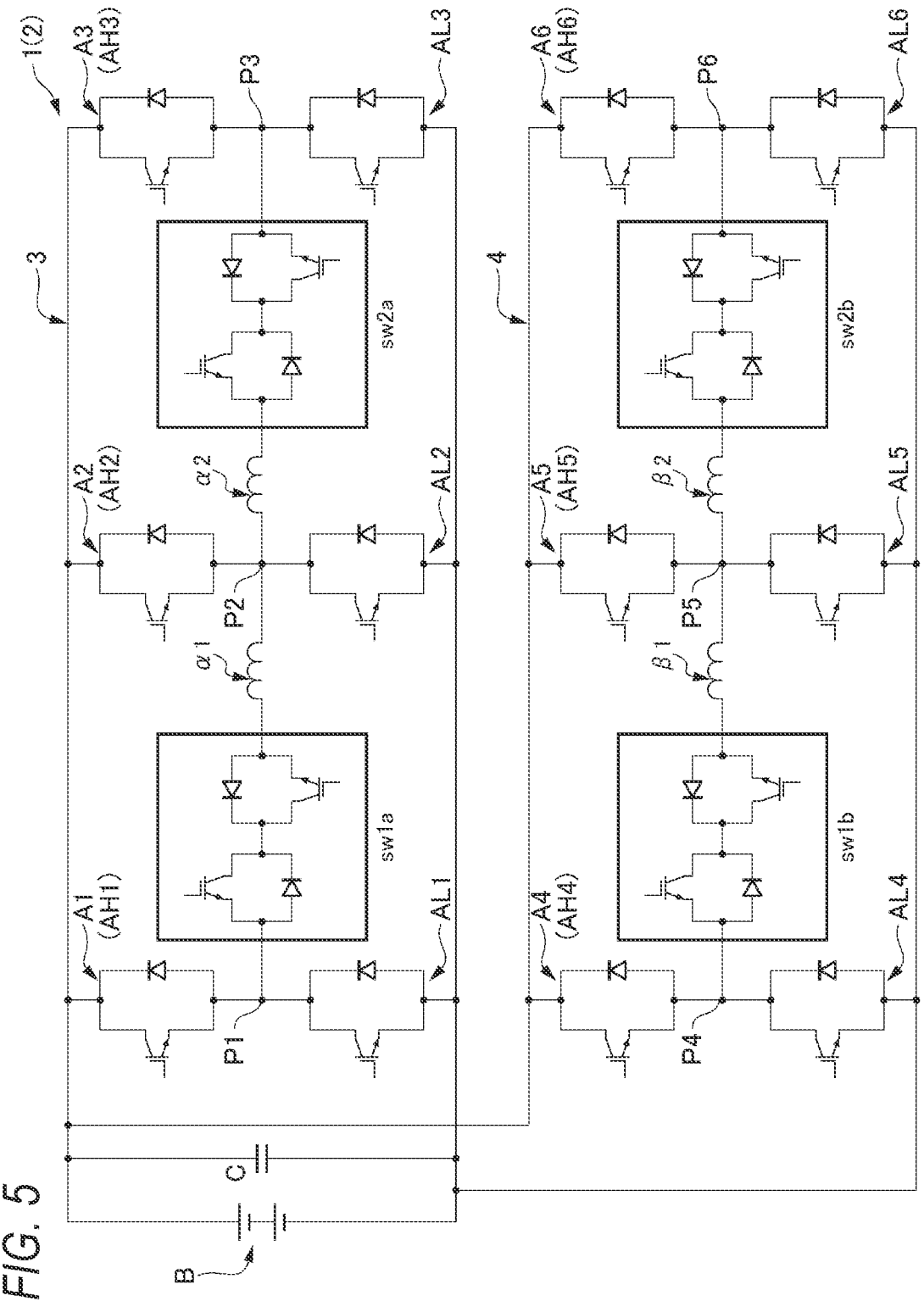
FIG. 5 is a circuit diagram showing a first arrangement example of bidirectional switches.

For example, as shown in FIG. 5, the first bidirectional switch sw1a and the third bidirectional switch sw2a are configured such that two sets of circuits each including a switching element and a diode in parallel are connected in series in opposite directions (forward directions of the diodes are connected to each other), and a bidirectional current flow can be switched between an ON state and an OFF state based on switching control of the two sets of switching elements. In the example of FIG. 1, the first bidirectional switch sw1a is provided in series with the first winding portion α1 on a side closer to the first arm A1, and the third bidirectional switch sw2a is provided in series with the second winding portion α2 on a side closer to the third arm A3.

The second circuit 4 includes fourth to sixth arms A4 to A6, a second bidirectional switch sw1b, and a fourth bidirectional switch sw2b.

The fourth to sixth arms A4 to A6 of the second circuit 4 are connected in parallel to the power supply B. The fourth arm A4 includes an upper arm AH4 in which a switching element H4 and a flyback diode D are provided in parallel, and a lower arm AL4 in which a switching element L4 and a flyback diode D are provided in parallel, the lower arm ALA being connected in series with the upper arm AH4 via a midpoint P4. The fifth arm A5 includes an upper arm AH5 in which a switching element H5 and a flyback diode D are provided in parallel, and a lower arm AL5 in which a switching element L5 and a flyback diode D are provided in parallel, the lower arm AL5 being connected in series with the upper arm AH5 via a midpoint P5. The sixth arm A6 includes an upper arm AH6 in which a switching element H6 and a flyback diode D are provided in parallel, and a lower arm AL6 in which a switching element L6 and a flyback diode D are provided in parallel, the lower arm AL6 being connected in series with the upper arm AH6 via a midpoint P6.

One end of the third winding portion β1 is connected to the midpoint P4 of the fourth arm A4, the other end of the third winding portion β1 and one end of the fourth winding portion β2 are connected to the midpoint P5 of the fifth arm A5, and the other end of the fourth winding portion β2 is connected to the midpoint P6 of the sixth arm A6.

The second bidirectional switch sw1b and the fourth bidirectional switch sw2b have the same configuration as the first bidirectional switch sw1a and the third bidirectional switch sw2a, and in the example of FIG. 1, the second bidirectional switch sw1b is provided in series with the third winding portion β1 on a side closer to the fourth arm A4, and the fourth bidirectional switch sw2b is provided in series with the fourth winding portion β2 on a side closer to the sixth arm A6.

According to the power supply circuit 2 as described above, by changing the number of winding portions to which electric power is supplied when electric power is supplied to the windings α and β of the respective phases, different characteristics can be imparted to the rotary electric machine M. In addition, in the case of the two-phase rotary electric machine, the number of lead wires is 6 and the number of switching elements is 12, so that it is possible to prevent complication of the configuration. In addition, since the number of turns of the first winding portion α1 and the number of turns of the second winding portion α2 are different from each other and the number of turns of the third winding portion β1 and the number of turns of the fourth winding portion β2 are different from each other, three different characteristics can be imparted to the rotary electric machine M. Hereinafter, three switchable modes will be described with reference to FIGS. 2 to 4.

(First Mode)

Figure 2:
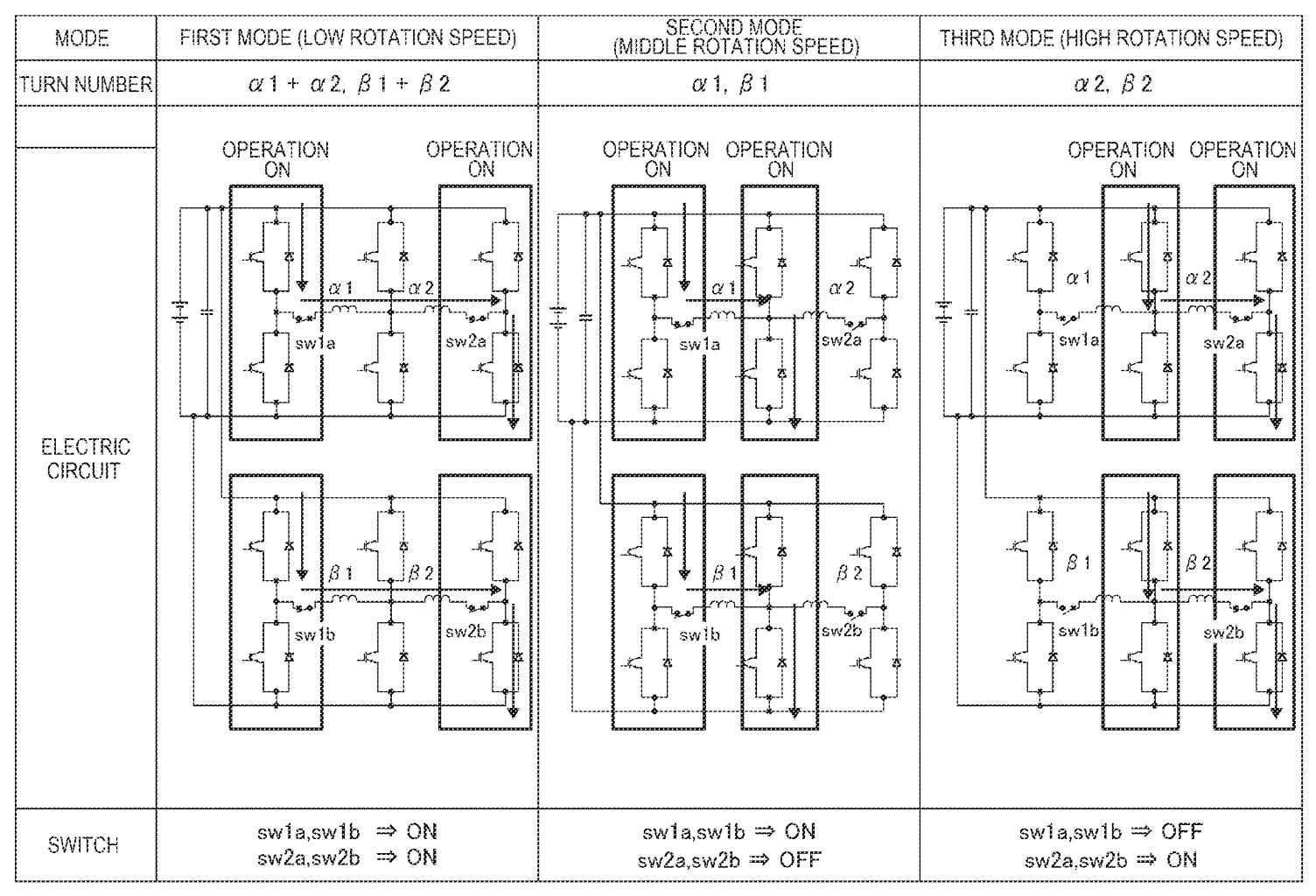
Figure 3:
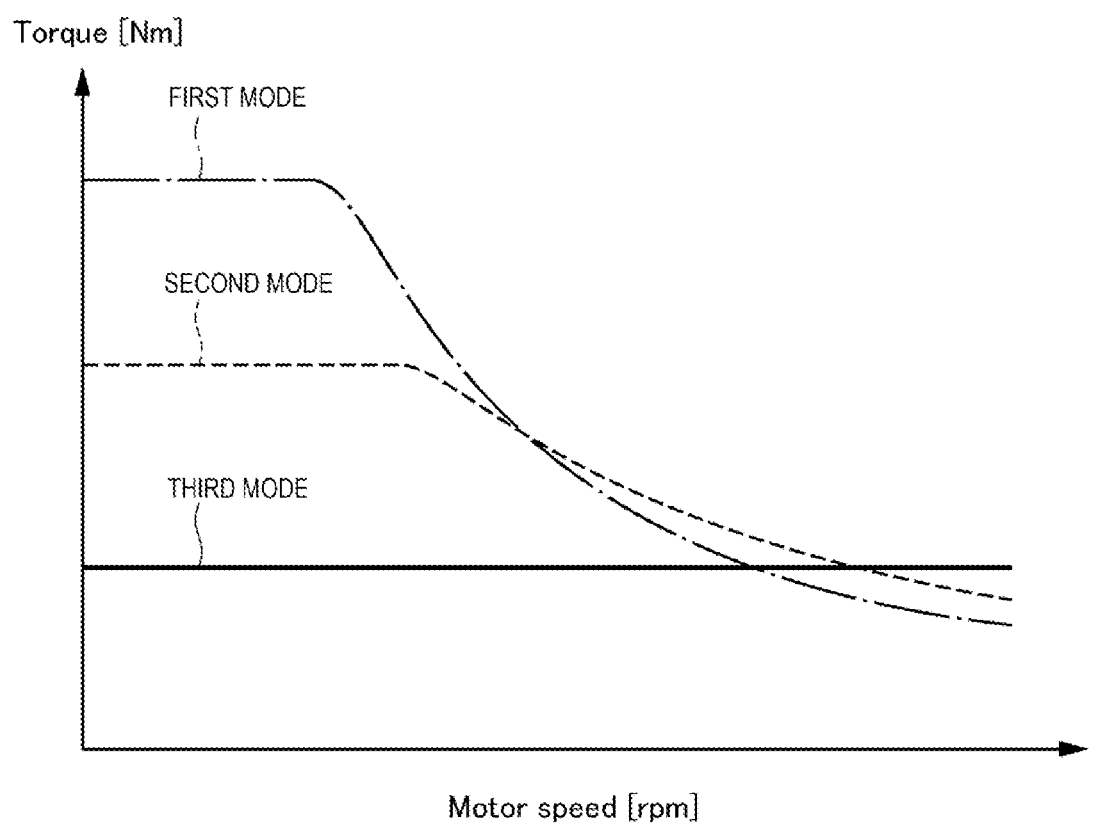
FIG. 3 is a graph showing torque performance in the three modes.
Figure 4:
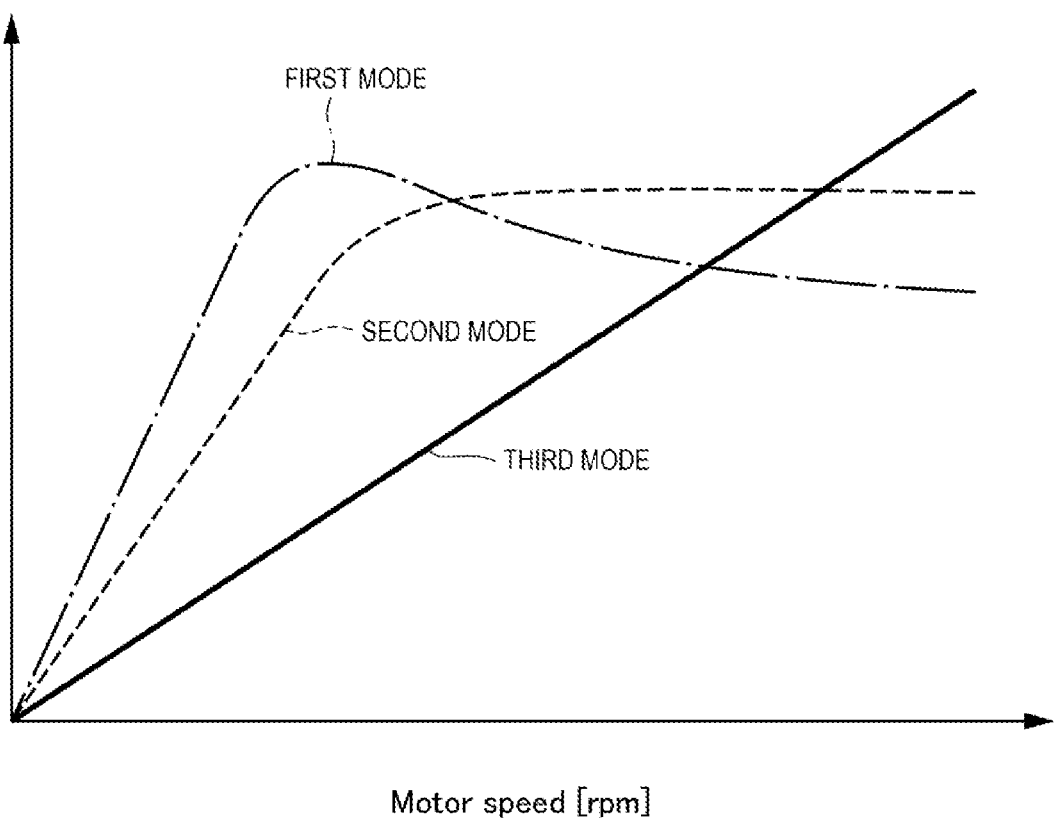
FIG. 4 is a graph showing output performance in the three modes.

As shown on a left side of FIG. 2, in a first mode, the first bidirectional switch sw1a, the second bidirectional switch sw1b, the third bidirectional switch sw2a, and the fourth bidirectional switch sw2b are turned on, and electric power is supplied to the first winding portion α1 and the second winding portion α2 of the first phase winding α and the third winding portion β1 and the fourth winding portion β2 of the second phase winding β based on switching control of the first arm A1, the third arm A3, the fourth arm A4, and the sixth arm A6. In such a first mode, since the number of turns of the windings α and β to which electric power is supplied (shown as turn number: α1+α2 and β1+β2 in FIG. 2) is large, as shown in FIGS. 3 and 4, torque and output in a low rotation speed range can be improved. In addition, an inductance increases, and a harmonic component of a current and iron loss can be reduced.

(Second Mode)

As shown at a center in a left-right direction of FIG. 2, in a second mode, the first bidirectional switch sw1a and the second bidirectional switch sw1b are turned on while the third bidirectional switch sw2a and the fourth bidirectional switch sw2b are turned off, and electric power is supplied to the first winding portion α1 of the first phase winding α and the third winding portion β1 of the second phase winding β based on switching control of the first arm A1, the second arm A2, the fourth arm A4, and the fifth arm A5. According to such a second mode, since the number of turns of the windings α and β to which electric power is supplied (shown as turn number: α1 and β1 in FIG. 2) is less than that in the first mode, as shown in FIGS. 3 and 4, magnetic flux and counter-electromotive force are reduced as compared with the first mode, and torque and output in a middle rotation speed range and a high rotation speed range can be improved.

In addition, by the third bidirectional switch sw2a and the fourth bidirectional switch sw2b, it is possible to prevent an induced current from flowing to the second winding portion α2 and the fourth winding portion β2, to which no electric power is supplied, due to energization of the first winding portion α1 and the third winding portion β1.

(Third Mode)

As shown on a right side of FIG. 2, in a third mode, the third bidirectional switch sw2a and the fourth bidirectional switch sw2b are turned on while the first bidirectional switch sw1a and the second bidirectional switch sw1b are turned off, and electric power is supplied to the second winding portion α2 of the first phase winding α and the fourth winding portion β2 of the second phase winding β based on the switching control of the second arm A2, the third arm A3, the fifth arm A5, and the sixth arm A6. According to such a third mode, since the number of turns of the windings α and β to which electric power is supplied (shown as turn number: α2 and β2 in FIG. 2) is still less than that in the second mode, as shown in FIGS. 3 and 4, the magnetic flux and the counter-electromotive force are further reduced as compared with the second mode, and torque and output in the high rotation speed range can be further improved.

In addition, by the first bidirectional switch sw1a and the second bidirectional switch sw1b, it is possible to prevent an induced current from flowing to the first winding portion α1 and the third winding portion β1, to which no electric power is supplied, due to energization of the second winding portion α2 and the fourth winding portion β2.

(Arrangement Example of Bidirectional Switches)

Next, a specific arrangement example of the first bidirectional switch sw1a, the second bidirectional switch sw1b, the third bidirectional switch sw2a, and the fourth bidirectional switch sw2b will be described with reference to FIGS. 5 to 7.

In an arrangement example of FIG. 5, as described above, the first bidirectional switch sw1a is provided in series with the first winding portion α1 on the side closer to the first arm A1, and the second bidirectional switch sw1b is provided in series with the third winding portion β1 on the side closer to the fourth arm A4. In addition, the third bidirectional switch sw2a is provided in series with the second winding portion α2 on the side closer to the third arm A3, and the fourth bidirectional switch sw2b is provided in series with the fourth winding portion β2 on the side closer to the sixth arm A6. The first bidirectional switch sw1a may also be provided in series with the first winding portion α1 on a side closer to the second arm A2, and the second bidirectional switch sw1b may also be provided in series with the third winding portion β1 on aside closer to the fifth arm A5. In addition, the third bidirectional switch sw2a may also be provided in series with the second winding portion α2 on a side closer to the second arm A2, and the fourth bidirectional switch sw2b may also be provided in series with the fourth winding portion β2 on a side closer to the fifth arm A5.

Figure 6:
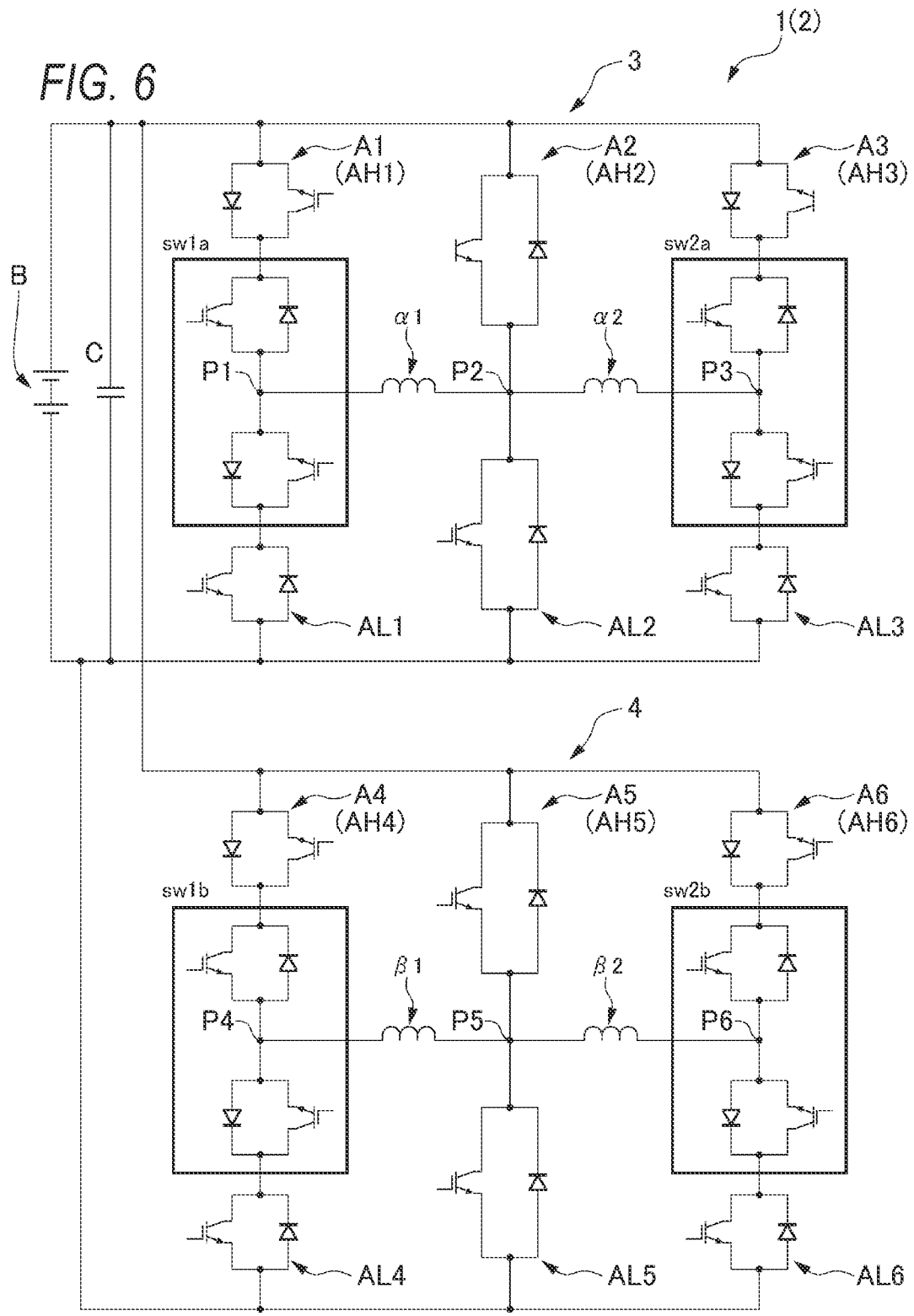
FIG. 6 is a circuit diagram showing a second arrangement example of the bidirectional switches.

In an arrangement example of FIG. 6, the first bidirectional switch sw1a is provided between the switching element H1 of the upper arm AH1 and the switching element L1 of the lower arm AL1 of the first arm A1, and the second bidirectional switch sw1b is provided between the switching element H4 of the upper arm AH4 and the switching element L4 of the lower arm AL4 of the fourth arm A4. In addition, the third bidirectional switch sw2a is provided between the switching element H3 of the upper arm AH3 and the switching element L3 of the lower arm AL3 of the third arm A3, and the fourth bidirectional switch sw2b is provided between the switching element H6 of the upper arm AH6 and the switching element L6 of the lower arm AL6 of the sixth arm A6. With such an arrangement configuration, the three modes can still be implemented in the same manner as the first embodiment described above.

Figure 7:
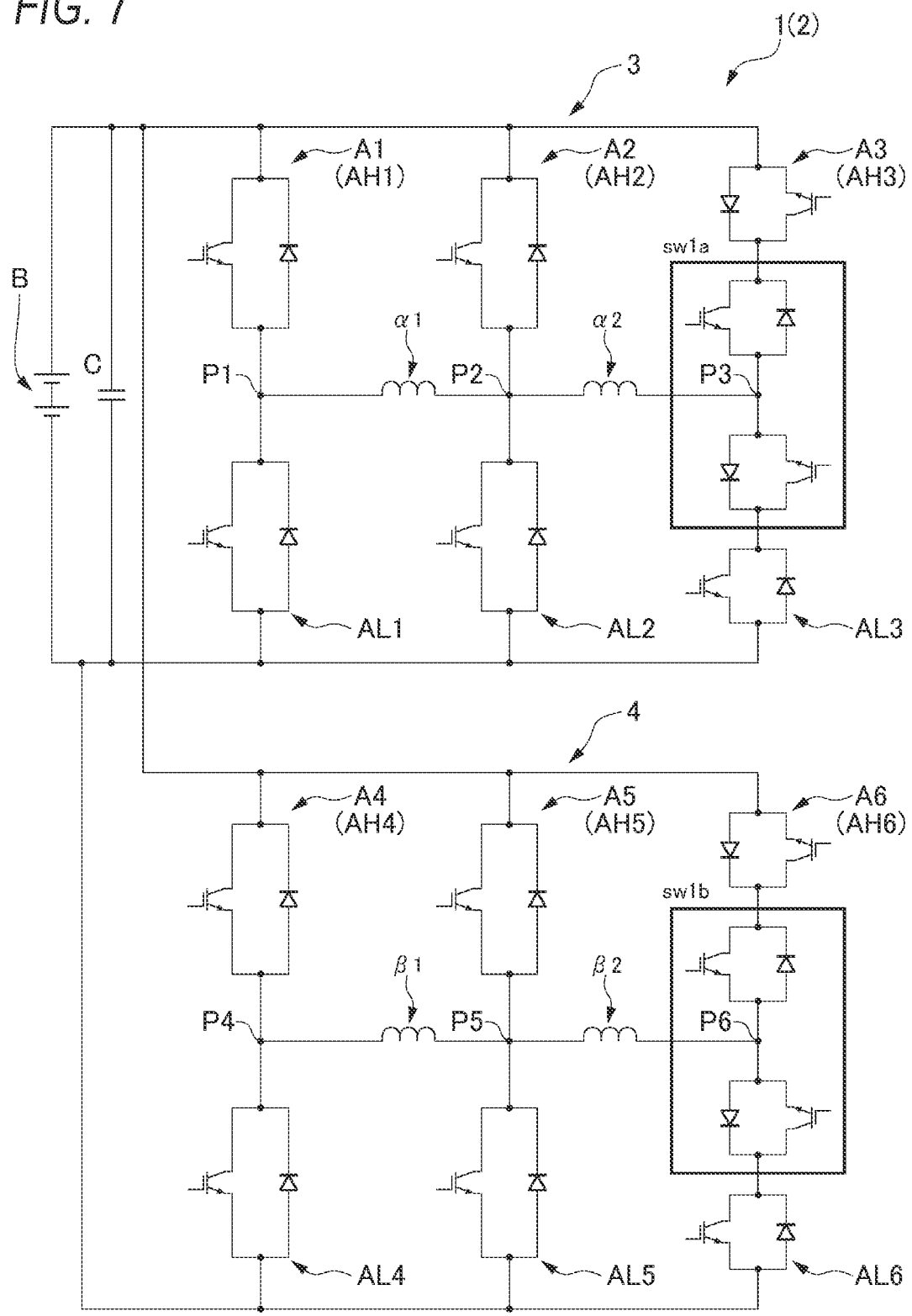
FIG. 7 is a circuit diagram showing a third arrangement example of the bidirectional switches.

In an arrangement example of FIG. 7, the first bidirectional switch sw1a is provided between the switching element H3 of the upper arm AH3 and the switching element L3 of the lower arm AL3 of the third arm A3, and the second bidirectional switch sw1b is provided between the switching element H6 of the upper arm AH6 and the switching element L6 of the lower arm AL6 of the sixth arm A6. According to such an arrangement configuration, although the number of switchable modes is reduced to two, namely the first mode and the second mode in FIG. 2, the number of bidirectional switches can be reduced so as to reduce costs. The first bidirectional switch sw1a may also be provided between the switching element H1 of the upper arm AH1 and the switching element L1 of the lower arm AL1 of the first arm A1, and the second bidirectional switch sw1b may also be provided between the switching element H4 of the upper arm AH4 and the switching element L4 of the lower arm AL4 of the fourth arm A4.

Second Embodiment

Next, a rotary electric machine system 1B and a power supply circuit 2B of a second embodiment will be described with reference to FIGS. 9 to 12. However, the same reference numerals as those of the first embodiment are used for configurations common to those of the first embodiment, and the description of the first embodiment may be incorporated.

In the rotary electric machine system 1B of the second embodiment, the number of winding portions of each phase of the rotary electric machine M is three, the number of bidirectional switches of the power supply circuit 2B is six, and the number of switchable modes is increased to six, which is different from the first embodiment. Hereinafter, differences from the first embodiment will be specifically described.

The rotary electric machine M of the second embodiment further includes a fifth winding portion α3 and a sixth winding portion β3, a first circuit 3B of the second embodiment further includes a seventh arm A7 and a fifth bidirectional switch sw3a, and a second circuit 4B of the second embodiment further includes an eighth arm A8 and a sixth bidirectional switch sw3b.

The fifth winding portion α3 is the first phase winding α connected in series with the first winding portion α1 and the second winding portion α2, and the number of turns of the fifth winding portion α3 is different from the number of turns of the first winding portion α1 and the second winding portion α2, and, for example, is less than the number of turns of the second winding portion α2.

The sixth winding portion β3 is the second phase winding β connected in series with the third winding portion β1 and the fourth winding portion β2, and the number of turns of the sixth winding portion β3 is different from the number of turns of the third winding portion β1 and the fourth winding portion β2, and, for example, is less than the number of turns of the fourth winding portion β2. However, the number of turns of the fifth winding portion α3 and the number of turns of the sixth winding portion β3 are the same.

The seventh arm A7 includes an upper arm AH7 in which a switching element H7 and a flyback diode D are provided in parallel, and a lower arm AL7 in which a switching element L7 and a flyback diode D are provided in parallel, the lower arm AL7 being connected in series with the upper arm AH7 via a midpoint P7. One end of the fifth winding portion α3 is connected to the midpoint P3 of the third arm A3, and the other end of the fifth winding portion α3 is connected to the midpoint P7 of the seventh arm A7. In addition, the fifth bidirectional switch sw3a is provided in series with the fifth winding portion α3 on a side closer to the seventh arm A7. The fifth bidirectional switch sw3a may also be provided in series with the fifth winding portion α3 on a side closer to the third arm A3.

The eighth arm A8 includes an upper arm AH8 in which a switching element H8 and a flyback diode D are provided in parallel, and a lower arm AL8 in which a switching element L8 and a flyback diode D are provided in parallel, the lower arm AL8 being connected in series with the upper arm AH8 via a midpoint P8. One end of the sixth winding portion β3 is connected to the midpoint P6 of the sixth arm A6, and the other end of the sixth winding portion β3 is connected to the midpoint P8 of the eighth arm A8. In addition, the sixth bidirectional switch sw3b is provided in series with the sixth winding portion β3 on a side closer to the eighth arm A8. The sixth bidirectional switch sw3b may also be provided in series with the sixth winding portion β3 on a side closer to the sixth arm A6. Hereinafter, six switchable modes will be described with reference to FIGS. 10 to 12.

(Eleventh Mode)

As shown on an upper left side of FIG. 10, in an eleventh mode, the first bidirectional switch sw1a, the second bidirectional switch sw1b, the third bidirectional switch sw2a, the fourth bidirectional switch sw2b, the fifth bidirectional switch sw3a, and the sixth bidirectional switch sw3b are turned on, and electric power is supplied to the first winding portion α1, the second winding portion α2, and the fifth winding portion α3 of the first phase winding α and the third winding portion β1, the fourth winding portion β2, and the sixth winding portion β3 of the second phase winding β based on switching control of the first arm A1, the seventh arm A7, the fourth arm A4, and the eighth arm A8 (shown as turn number: α1+α2+α3, β1+β2+β3 in FIG. 10).

(Twelfth Mode)

As shown at an upper center in a left-right direction of FIG. 10, in a twelfth mode, the first bidirectional switch sw1a, the second bidirectional switch sw1b, the third bidirectional switch sw2a, and the fourth bidirectional switch sw2b are turned on while the fifth bidirectional switch sw3a and the sixth bidirectional switch sw3b are turned off, and electric power is supplied to the first winding portion α1 and the second winding portion α2 of the first phase winding α and the third winding portion β1 and the fourth winding portion β2 of the second phase winding R based on the switching control of the first arm A1, the third arm A3, the fourth arm A4, and the sixth arm A6 (shown as turn number: α1+α2 and β1+β2 in FIG. 10).

(Thirteenth Mode)

As shown on an upper right side of FIG. 10, in a thirteenth mode, the third bidirectional switch sw2a, the fourth bidirectional switch sw2b, the fifth bidirectional switch sw3a, and the sixth bidirectional switch sw3b are turned on while the first bidirectional switch sw1a and the second bidirectional switch sw1b are turned off, and electric power is supplied to the second winding portion α2 and the fifth winding portion α3 of the first phase winding α and the fourth winding portion β2 and the sixth winding portion β3 of the second phase winding β based on the switching control of the second arm A2, the seventh arm A7, the fifth arm A5, and the eighth arm A8 (shown as turn number: α2+α3 and β2+β3 in FIG. 10).

(Fourteenth Mode)

As shown on a lower left side of FIG. 10, in a fourteenth mode, the first bidirectional switch sw1a and the second bidirectional switch sw1b are turned on while the third bidirectional switch sw2a, the fourth bidirectional switch sw2b, the fifth bidirectional switch sw3a, and the sixth bidirectional switch sw3b are turned off, and electric power is supplied to the first winding portion α1 of the first phase winding α and the third winding portion β1 of the second phase winding β based on the switching control of the first arm A1, the second arm A2, the fourth arm A4, and the fifth arm A5 (shown as turn number: α1 and β1 in FIG. 10).

(Fifteenth Mode)

As shown at a lower center in the left-right direction of FIG. 10, in a fifteenth mode, the third bidirectional switch sw2a and the fourth bidirectional switch sw2b are turned on while the first bidirectional switch sw1a, the second bidirectional switch sw1b, the fifth bidirectional switch sw3a, and the sixth bidirectional switch sw3b are turned off, and electric power is supplied to the second winding portion α2 of the first phase winding α and the fourth winding portion β2 of the second phase winding β based on the switching control of the second arm A2, the third arm A3, the fifth arm A5, and the sixth arm A6 (shown as turn number: α2 and β2 in FIG. 10).

(Sixteenth Mode)

As shown on a lower right side of FIG. 10, in a sixteenth mode, the fifth bidirectional switch sw3a and the sixth bidirectional switch sw3b are turned on while the first bidirectional switch sw1a, the second bidirectional switch sw1b, the third bidirectional switch sw2a, and the fourth bidirectional switch sw2b are turned off, and electric power is supplied to the fifth winding portion α3 of the first phase winding α and the sixth winding portion β3 of the second phase winding β based on the switching control of the third arm A3, the seventh arm A7, the sixth arm A6, and the eighth arm A8 (shown as turn number: α3 and β3 in FIG. 10).

According to the second embodiment as described above, as shown in FIGS. 11 and 12, by reducing the number of turns of the windings α and β to which electric power is supplied, the magnetic flux and the counter-electromotive force are reduced, and the torque and the output can be improved on a high rotation speed side. In addition, since more characteristics can be imparted to the rotary electric machine M as compared with the first embodiment, the output efficiency can be further improved.

Like the change from the first embodiment to the second embodiment, the present invention can freely design the rotary electric machine M having a plurality of characteristics by increasing the number of arms connected in parallel to each circuit and increasing the number of bidirectional switches the number of which is the same as the increased number of arms.

Although various embodiments have been described above with reference to the drawings, it is needless to say that the present invention is not limited to these examples. It is apparent that those skilled in the art can conceive of various modifications and alterations within the scope described in the claims, and it is understood that such modifications and alterations naturally fall within the technical scope of the present invention. In addition, the respective constituent elements in the above-described embodiments may be combined as desired without departing from the gist of the invention.

For example, the bidirectional switch may be a contactor mechanical switch, a reverse blocking IGBT, or the like as long as the bidirectional switch is capable of blocking the flow of the current in both directions.

In the present specification, at least the following matters are described. Although corresponding constituent elements or the like in the above-described embodiments are shown in parentheses, the present invention is not limited thereto.

(1) A power supply circuit (power supply circuit 2) configured to supply electric power to a rotary electric machine (rotary electric machine M) that includes: a first phase winding (first phase winding α) including a first winding portion (first winding portion α1) and a second winding portion (second winding portion α2); and a second phase winding (second phase winding β) including a third winding portion (third winding portion β1) and a fourth winding portion (fourth winding portion β2), the power supply circuit including:

a first circuit (first circuit 3) that is connectable to a power supply (power supply B) and connected to the first phase winding; and a second circuit (second circuit 4) that is connectable to the power supply in parallel with the first circuit and connected to the second phase winding, in which the first circuit includes: first to third arms (first to third arms A1 to A3) in each of which an upper arm (upper arms AH1 to AH3) provided with a switching element (switching elements H1 to H3) and a lower arm (lower arms AL1 to AL3) provided with a switching element (switching elements L1 to L3) are connected at a midpoint (midpoints P1 to P3) of each arm; and a first switch (first bidirectional switch sw1a), the midpoint of the first arm is connected to one end of the first winding portion, the midpoint of the second arm is connected to another end of the first winding portion and one end of the second winding portion, the midpoint of the third arm is connected to another end of the second winding portion, the first switch
is provided in series with the first winding portion or between the switching element of the upper arm of the first arm and the switching element of the lower arm of the first arm, or
is provided in series with the second winding portion or between the switching element of the upper arm of the third arm and the switching element of the lower arm of the third arm, the second circuit includes: fourth to sixth arms (fourth to sixth arms A4 to A6) in each of which an upper arm (upper arms AH4 to AH6) provided with a switching element (switching elements H4 to H6) and a lower arm (lower arms AL4 to AL6) provided with a switching element (switching elements L4 to L6) are connected at a midpoint (midpoints P4 to P6) of each arm; and a second switch (second bidirectional switch sw1b), the midpoint of the fourth arm is connected to one end of the third winding portion, the midpoint of the fifth arm is connected to another end of the third winding portion and one end of the fourth winding portion, the midpoint of the sixth arm is connected to another end of the fourth winding portion, and the second switch
is provided in series with the third winding portion or between the switching element of the upper arm of the fourth arm and the switching element of the lower arm of the fourth arm, or
is provided in series with the fourth winding portion or between the switching element of the upper arm of the sixth arm and the switching element of the lower arm of the sixth arm.

According to (1), by changing the number of winding portions to which electric power is supplied when electric power is supplied to the windings of the respective phases, different characteristics can be imparted to the rotary electric machine. As a result, an efficient operating point can be selected, and thus output efficiency can be improved. In addition, for example, in a case of a two-phase rotary electric machine, the number of lead wires is 6 and the number of switching elements is 12, so that it is possible to prevent complication of the configuration.

In addition, by the first switch and the second switch, it is possible to prevent an induced current from flowing to one of the first winding portion and the third winding portion, and the second winding portion and the fourth winding portion, to which no electric power is supplied, due to energization of the other one winding portion.

(2) The power supply circuit according to (1), in which the power supply circuit is configured to be switchable between a first mode and a second mode, the first mode is a mode in which the first switch and the second switch are turned on, and electric power is supplied to the first winding portion and the second winding portion of the first phase winding and to the third winding portion and the fourth winding portion of the second phase winding, and the second mode is a mode in which the first switch and the second switch are turned off, and electric power is supplied to the first winding portion of the first phase winding and the third winding portion of the second phase winding, or electric power is supplied to the second winding portion of the first phase winding and the fourth winding portion of the second phase winding.

According to (2), in the first mode, since the number of turns of the winding to which the electric power is supplied is large, torque is improved, an inductance is increased, a harmonic component of a current is reduced, and iron loss is reduced. On the other hand, in the second mode, since the number of turns of the winding to which the electric power is supplied is small, magnetic flux is reduced so as to reduce a counter-electromotive force, and an output on a high rotation speed side can be improved.

(3) The power supply circuit according to (1), in which the first circuit further includes a third switch (third bidirectional switch sw2a), the first switch is provided in series with the first winding portion or between the switching element of the upper arm of the first arm and the switching element of the lower arm of the first arm, the third switch is provided in series with the second winding portion or between the switching element of the upper arm of the third arm and the switching element of the lower arm of the third arm, the second circuit further includes a fourth switch (fourth bidirectional switch sw2b), the second switch is provided in series with the third winding portion or between the switching element of the upper arm of the fourth arm and the switching element of the lower arm of the fourth arm, and the fourth switch is provided in series with the fourth winding portion or between the switching element of the upper arm of the sixth arm and the switching element of the lower arm of the sixth arm.

According to (3), since the mode can be switched by switching the first to fourth switches, a control load can be reduced.

(4) The power supply circuit according to (3), in which a number of turns of the first winding portion and a number of turns of the second winding portion are different from each other, and a number of turns of the third winding portion and a number of turns of the fourth winding portion are different from each other.

According to (4), since three different characteristics can be imparted to the rotary electric machine, the output efficiency can be further improved.

(5) The power supply circuit according to (4), in which the power supply circuit is configured to be switchable between a first mode, a second mode, and a third mode, the first mode is a mode in which the first switch, the second switch, the third switch and the fourth switch are turned on, and electric power is supplied to the first winding portion and the second winding portion of the first phase winding and to the third winding portion and the fourth winding portion of the second phase winding, the second mode is a mode in which the first switch and the second switch are turned on while the third switch and the fourth switch are turned off, and electric power is supplied to the first winding portion of the first phase winding and the third winding portion of the second phase winding, and the third mode is a mode in which the third switch and the fourth switch are turned on while the first switch and the second switch are turned off, and electric power is supplied to the second winding portion of the first phase winding and the fourth winding portion of the second phase winding.

According to (5), in the first mode, since the number of turns of the winding to which the electric power is supplied is large, the torque is improved, the inductance is increased, the harmonic component of the current is reduced, and the iron loss is reduced. On the other hand, in the second mode and the third mode, since the number of turns of the winding to which the electric power is supplied is small, the magnetic flux is reduced so as to reduce the counter-electromotive force, and the output on the high rotation speed side can be improved. In addition, since the number of turns of the winding to which the electric power is supplied is different between the second mode and the third mode, it is possible to select an appropriate mode according to a use state of the rotary electric machine.

(6) The power supply circuit according to any one of (1) to (5), in which the first phase winding further includes a fifth winding portion connected to the first winding portion and the second winding portion, the second phase winding further includes a sixth winding portion connected to the third winding portion and the fourth winding portion, the first circuit further includes: a seventh arm (seventh arm A7) in which an upper arm (upper arm AH7) provided with a switching element (switching element H7) and a lower arm (lower arm AL7) provided with a switching element (switching element L7) are connected at a midpoint (midpoint P7) of the seventh arm; and a fifth switch (fifth bidirectional switch sw3a), the midpoint of the third arm is connected to one end of the fifth winding portion (fifth winding portion α3) of the first phase winding, the midpoint of the seventh arm is connected to another end of the fifth winding portion, the fifth switch is provided in series with the fifth winding portion or between the switching element of the upper arm of the seventh arm and the switching element of the lower arm of the seventh arm, the second circuit further includes: an eighth arm (eighth arm A8) in which an upper arm (upper arm AH8) provided with a switching element (switching element H8) and a lower arm (lower arm AL8) provided with a switching element (switching element L8) are connected at a midpoint (midpoint P8) of the eighth arm; and a sixth switch (sixth bidirectional switch sw3b), the midpoint of the sixth arm is connected to one end of the sixth winding portion (sixth winding portion β3) of the second phase winding, the midpoint of the eighth arm is connected to another end of the sixth winding portion, and the sixth switch is provided in series with the sixth winding portion or between the switching element of the upper arm of the eighth arm and the switching element of the lower arm of the eighth arm.

According to (6), by increasing the number of the winding portions of the winding of each phase, more characteristics can be imparted to the rotary electric machine, and thus the output efficiency can be further improved.

(7) The power supply circuit according to (6), in which
a number of turns of the first winding portion, a number of turns of the second winding portion, and a number of turns of the fifth winding portion are different from each other, and
a number of turns of the third winding portion, a number of turns of the fourth winding portion, and a number of turns of the sixth winding portion are different from each other.

According to (7), by increasing the number of winding portions of the windings of the two phases and further changing the number of turns of the winding portions, more characteristics can be imparted to the rotary electric machine, and thus the output efficiency can be further improved.

(8) A rotary electric machine system (rotary electric machine system 1) including:
a rotary electric machine (rotary electric machine M) including a first phase winding (first phase winding α) and a second phase winding (second phase winding β); and
a power supply circuit (power supply circuit 2) configured to supply electric power to the rotary electric machine, in which
the first phase winding includes a first winding portion (first winding portion α1) and a second winding portion (second winding portion α2),
the second phase winding includes a third winding portion (third winding portion β1) and a fourth winding portion (fourth winding portion β2),
the power supply circuit includes:
a first circuit (first circuit 3) that is connectable to a power supply (power supply B) and connected to the first phase winding; and
a second circuit (second circuit 4) that is connectable to the power supply in parallel with the first circuit and connected to the second phase winding,
the first circuit includes: first to third arms (first to third arms A1 to A3) in each of which an upper arm (upper arms AH1 to AH3) provided with a switching element (switching elements H1 to H3) and a lower arm (lower arms AL1 to AL3) provided with a switching element (switching elements L1 to L3) are connected at a midpoint (midpoints P1 to P3) of each arm; and a first switch (first bidirectional switch sw1a),
the midpoint of the first arm is connected to one end of the first winding portion, the midpoint of the second arm is connected to another end of the first winding portion and one end of the second winding portion, the midpoint of the third arm is connected to another end of the second winding portion, the first switch
is provided in series with the first winding portion or between the switching element of the upper arm of the first arm and the switching element of the lower arm of the first arm, or
is provided in series with the second winding portion or between the switching element of the upper arm of the third arm and the switching element of the lower arm of the third arm, the second circuit includes: fourth to sixth arms (fourth to sixth arms A4 to A6) in each of which an upper arm (upper arms AH4 to AH6) provided with a switching element (switching elements H4 to H6) and a lower arm (lower arms AL4 to AL6) provided with a switching element (switching elements L4 to L6) are connected at a midpoint (midpoints P4 to P6) of each arm; and a second switch (second bidirectional switch sw1b), the midpoint of the fourth arm is connected to one end of the third winding portion, the midpoint of the fifth arm is connected to another end of the third winding portion and one end of the fourth winding portion, the midpoint of the sixth arm is connected to another end of the fourth winding portion, and the second switch
is provided in series with the third winding portion or between the switching element of the upper arm of the fourth arm and the switching element of the lower arm of the fourth arm, or
is provided in series with the fourth winding portion or between the switching element of the upper arm of the sixth arm and the switching element of the lower arm of the sixth arm.

According to (8), by changing the number of winding portions to which electric power is supplied when electric power is supplied to the windings of the respective phases, different characteristics can be imparted to the rotary electric machine. As a result, an efficient operating point can be selected, and thus output efficiency can be improved.

What is claimed is:

1. A power supply circuit configured to supply electric power to a rotary electric machine that includes: a first phase winding including a first winding portion and a second winding portion; and a second phase winding including a third winding portion and a fourth winding portion,
the power supply circuit comprising:
a first circuit that is connectable to a power supply and connected to the first phase winding; and
a second circuit that is connectable to the power supply in parallel with the first circuit and connected to the second phase winding, wherein
the first circuit includes: first to third arms in each of which an upper arm provided with a switching element and a lower arm provided with a switching element are connected at a midpoint of each arm; and a first switch,
the midpoint of the first arm is connected to one end of the first winding portion,
the midpoint of the second arm is connected to another end of the first winding portion and one end of the second winding portion,
the midpoint of the third arm is connected to another end of the second winding portion, the first switch
is provided in series with the first winding portion or between the switching element of the upper arm of the first arm and the switching element of the lower arm of the first arm, or
is provided in series with the second winding portion or between the switching element of the upper arm of the third arm and the switching element of the lower arm of the third arm,
the second circuit includes: fourth to sixth arms in each of which an upper arm provided with a switching element and a lower arm provided with a switching element are connected at a midpoint of each arm; and a second switch,
the midpoint of the fourth arm is connected to one end of the third winding portion,
the midpoint of the fifth arm is connected to another end of the third winding portion and one end of the fourth winding portion,
the midpoint of the sixth arm is connected to another end of the fourth winding portion,
the second switch
is provided in series with the third winding portion or between the switching element of the upper arm of the fourth arm and the switching element of the lower arm of the fourth arm, or
is provided in series with the fourth winding portion or between the switching element of the upper arm of the sixth arm and the switching element of the lower arm of the sixth arm,
the first circuit further includes a third switch,
the first switch is provided in series with the first winding portion or between the switching element of the upper arm of the first arm and the switching element of the lower arm of the first arm,
the third switch is provided in series with the second winding portion or between the switching element of the upper arm of the third arm and the switching element of the lower arm of the third arm,
the second circuit further includes a fourth switch,
the second switch is provided in series with the third winding portion or between the switching element of the upper arm of the fourth arm and the switching element of the lower arm of the fourth arm,
the fourth switch is provided in series with the fourth winding portion or between the switching element of the upper arm of the sixth arm and the switching element of the lower arm of the sixth arm,
a number of turns of the first winding portion and a number of turns of the second winding portion are different from each other, and
a number of turns of the third winding portion and a number of turns of the fourth winding portion are different from each other.

2. The power supply circuit according to claim 1, wherein the power supply circuit is configured to be switchable between a first mode, a second mode, and a third mode,
the first mode is a mode in which the first switch, the second switch, the third switch and the fourth switch are turned on, and electric power is supplied to the first winding portion and the second winding portion of the first phase winding and to the third winding portion and the fourth winding portion of the second phase winding,
the second mode is a mode in which the first switch and the second switch are turned on while the third switch and the fourth switch are turned off, and electric power is supplied to the first winding portion of the first phase winding and the third winding portion of the second phase winding, and
the third mode is a mode in which the third switch and the fourth switch are turned on while the first switch and the second switch are turned off, and electric power is supplied to the second winding portion of the first phase winding and the fourth winding portion of the second phase winding.

3. A power supply circuit configured to supply electric power to a rotary electric machine that includes: a first phase winding including a first winding portion and a second winding portion; and a second phase winding including a third winding portion and a fourth winding portion, the power supply circuit comprising:
a first circuit that is connectable to a power supply and connected to the first phase winding; and
a second circuit that is connectable to the power supply in parallel with the first circuit and connected to the second phase winding, wherein
the first circuit includes: first to third arms in each of which an upper arm provided with a switching element and a lower arm provided with a switching element are connected at a midpoint of each arm; and a first switch,
the midpoint of the first arm is connected to one end of the first winding portion,
the midpoint of the second arm is connected to another end of the first winding portion and one end of the second winding portion,
the midpoint of the third arm is connected to another end of the second winding portion,
the first switch
is provided in series with the first winding portion or between the switching element of the upper arm of the first arm and the switching element of the lower arm of the first arm, or
is provided in series with the second winding portion or between the switching element of the upper arm of the third arm and the switching element of the lower arm of the third arm,
the second circuit includes: fourth to sixth arms in each of which an upper arm provided with a switching element and a lower arm provided with a switching element are connected at a midpoint of each arm; and a second switch,
the midpoint of the fourth arm is connected to one end of the third winding portion,
the midpoint of the fifth arm is connected to another end of the third winding portion and one end of the fourth winding portion,
the midpoint of the sixth arm is connected to another end of the fourth winding portion, and
the second switch
is provided in series with the third winding portion or between the switching element of the upper arm of the fourth arm and the switching element of the lower arm of the fourth arm, or
is provided in series with the fourth winding portion or between the switching element of the upper arm of the sixth arm and the switching element of the lower arm of the sixth arm,
the first phase winding further includes a fifth winding portion connected to the first winding portion and the second winding portion,
the second phase winding further includes a sixth winding portion connected to the third winding portion and the fourth winding portion, the first circuit further includes: a seventh arm in which an upper arm provided with a switching element and a lower arm provided with a switching element are connected at a midpoint of the seventh arm; and a fifth switch, the midpoint of the third arm is connected to one end of the fifth winding portion of the first phase winding, the midpoint of the seventh arm is connected to another end of the fifth winding portion, the fifth switch is provided in series with the fifth winding portion or between the switching element of the upper arm of the seventh arm and the switching element of the lower arm of the seventh arm, the second circuit further includes: an eighth arm in which an upper arm provided with a switching element and a lower arm provided with a switching element are connected at a midpoint of the eighth arm; and a sixth switch, the midpoint of the sixth arm is connected to one end of the sixth winding portion of the second phase winding, the midpoint of the eighth arm is connected to another end of the sixth winding portion, the sixth switch is provided in series with the sixth winding portion or between the switching element of the upper arm of the eighth arm and the switching element of the lower arm of the eighth arm, a number of turns of the first winding portion, a number of turns of the second winding portion, and a number of turns of the fifth winding portion are different from each other, and a number of turns of the third winding portion, a number of turns of the fourth winding portion, and a number of turns of the sixth winding portion are different from each other.

4. A rotary electric machine system comprising:

a rotary electric machine including a first phase winding and a second phase winding; and a power supply circuit configured to supply electric power to the rotary electric machine, wherein the first phase winding includes a first winding portion and a second winding portion, the second phase winding includes a third winding portion and a fourth winding portion, the power supply circuit includes:
  a first circuit that is connectable to a power supply and connected to the first phase winding; and
  a second circuit that is connectable to the power supply in parallel with the first circuit and connected to the second phase winding, the first circuit includes: first to third arms in each of which an upper arm provided with a switching element and a lower arm provided with a switching element are connected at a midpoint of each arm; and a first switch, the midpoint of the first arm is connected to one end of the first winding portion, the midpoint of the second arm is connected to another end of the first winding portion and one end of the second winding portion, the midpoint of the third arm is connected to another end of the second winding portion, the first switch
  is provided in series with the first winding portion or between the switching element of the upper arm of the first arm and the switching element of the lower arm of the first arm, or
  is provided in series with the second winding portion or between the switching element of the upper arm of the third arm and the switching element of the lower arm of the third arm, the second circuit includes: fourth to sixth arms in each of which an upper arm provided with a switching element and a lower arm provided with a switching element are connected at a midpoint of each arm; and a second switch, the midpoint of the fourth arm is connected to one end of the third winding portion, the midpoint of the fifth arm is connected to another end of the third winding portion and one end of the fourth winding portion, the midpoint of the sixth arm is connected to another end of the fourth winding portion, the second switch
  is provided in series with the third winding portion or between the switching element of the upper arm of the fourth arm and the switching element of the lower arm of the fourth arm, or
  is provided in series with the fourth winding portion or between the switching element of the upper arm of the sixth arm and the switching element of the lower arm of the sixth arm, the first circuit further includes a third switch, the first switch is provided in series with the first winding portion or between the switching element of the upper arm of the first arm and the switching element of the lower arm of the first arm, the third switch is provided in series with the second winding portion or between the switching element of the upper arm of the third arm and the switching element of the lower arm of the third arm, the second circuit further includes a fourth switch, the second switch is provided in series with the third winding portion or between the switching element of the upper arm of the fourth arm and the switching element of the lower arm of the fourth arm, the fourth switch is provided in series with the fourth winding portion or between the switching element of the upper arm of the sixth arm and the switching element of the lower arm of the sixth arm, and wherein a number of turns of the first winding portion and a number of turns of the second winding portion are different from each other, and a number of turns of the third winding portion and a number of turns of the fourth winding portion are different from each other.

* * * * *